May 20, 1930.    L. McA. GOODWIN    1,759,693
INSECT DESTROYING DEVICE
Filed Oct. 13, 1928

Patented May 20, 1930

1,759,693

UNITED STATES PATENT OFFICE

LOOMIS McARTHUR GOODWIN, OF RALEIGH, NORTH CAROLINA

INSECT-DESTROYING DEVICE

Application filed October 13, 1928. Serial No. 312,383.

This invention relates to certain improvements in insect destroying devices, and particularly to such a device to be used as an attachment for cultivator plows and like agricultural implements.

In the specific embodiment of the invention, the device is primarily intended for use in connection with cotton cultivators, whereby, simultaneously with the cultivating of the crop, the boll weevil will be dislodged from the plants and destroyed.

The object of the invention is the provision of a device of the character indicated, simple in construction and operation and easily attached or adapted to the various forms of cultivator implements or plows, requiring no special tools or the assistance of a skilled mechanic to install.

A further object resides in the fact that the attachment can be produced to sell at a minimum cost yet will accomplish the desired result in just as an efficient manner as the more expensive or complicated machines now on the market.

Another important feature is the adjustability of the two principal parts of the device, relative to each other and to the ground, whereby cotton plants of different heights can be efficiently and effectively operated upon during the various stages of development of the cotton plants.

The preferred embodiment of the invention is illustrated in the accompanying drawings, in which, Fig. 1 is a top plan view of the assembled device;

Figure 1:
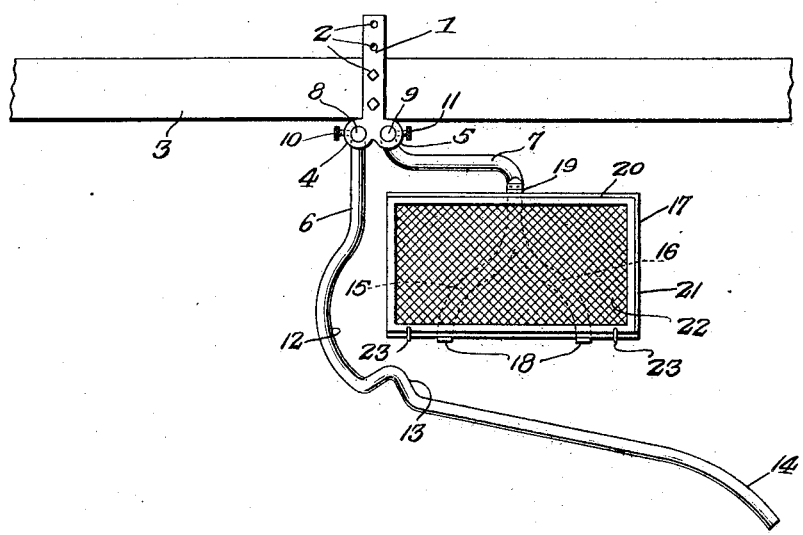

Referring to the drawings in detail, the improved device comprises a bracket 1 provided with a series of openings 2, whereby the same may be transversely adjustably secured to a plow beam or the like 3.

One end of the bracket 1 is constructed with vertical cylindrical extensions 4 and 5, for the reception of a wiper arm 6 and a pan supporting arm 7 respectively. The inner ends of the arms 6 and 7 are formed with upstanding portions 8 and 9 vertically slidable and adjustable in the bracket extensions 4 and 5 and adapted to be maintained in their desired adjusted positions by set screws or the like 10 and 11.

The extended part of the wiper arm 6 is preferably constructed and shown with a curved portion 12, and adjacent abrupt inwardly bent portion 13 and terminating in an outwardly directed extremity 14.

Figures 2, 3:
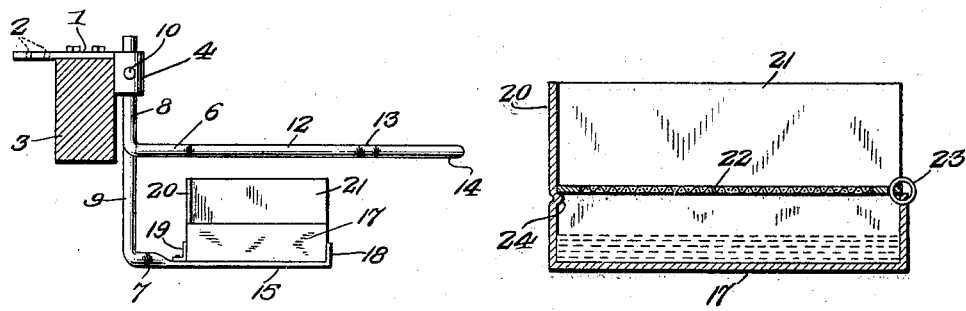
Fig. 2 is a rear elevation thereof.
Fig. 3 is an enlarged view partly in section of the insect receiving pan.

The arm 7 is divided near its outer end portion to provide supporting legs 15 and 16 for a pan 17, said pan being held frictionally in place by upstanding clips 18 and 19, as shown, but capable of longitudinal sliding adjustments with respect to its supports. This pan is comparatively shallow along its outside and rear end, but its inside and forward end are extended upwardly as at 20 and 21 for the purpose to be hereinafter more fully set forth. The pan is intended to receive a small amount of kerosene or the like and mounted above the same is a screen 22, hinged along one side, preferably by ring-like members 23 and supported at its opposite side by punched-in portions or similar projections 24, all of which is clearly shown in Fig. 3. The screen is for the obvious purpose of preventing the tops of the plants and the cotton bolls from coming in contact with the kerosene.

In the practical use of the device the same is preferably attached to the cultivator or plow beam and while the said cultivator is being drawn along the rows of cotton plants the plants will be gathered in by the wiper arm 6 and bent over the rear end of the pan 17 as the curved portion 12 passes over the tops of said plants, this operation shaking or brushing the boll weevil from the cotton bolls into pan 17 where they are killed upon coming in contact with the kerosene. By the use of the additional curved projection 13 the plants will be given a sudden jarring action prior to the wiping operation which will more effectively accomplish the desired result.

By raising the inner side portion and the forward end of the pan, the liability of the insects being thrown over the pan will be greatly eliminated and practically avoided.

From the foregoing it will be noted that both the wiper arm and pan supporting arm can be independently adjusted both horizontally and vertically which makes it possible to obtain the maximum efficiency from the device in working plants of various sizes.

The device arranged as shown is used when cultivating down one side of the rows of plants but where the cultivator is run down the middle between the rows, two of these devices are used, one on each side of the plow beam. The device is also applicable to metallic plow beams it only being necessary to use U-bolts for securing the bracket arm 1 instead of the ordinary bolts as shown.

What I claim is:

1. In an insect destroying device, the combination with a supporting beam, of a bracket comprising a unitary member secured thereto, a pan supporting arm adjustably secured to said bracket and a wiper arm adapted to cooperate with said pan also adjustably carried by said bracket.

2. In an insect destroying device, the combination with a supporting beam, of a pan supporting arm and a wiper arm, a bracket comprising a unitary member, common to both of said arms and means for independently adjusting said arms in said bracket.

3. In an insect destroying device, the combination with a supporting beam, of a pan supporting arm and a wiper arm and a bracket comprising a unitary member, common to both of said arms provided with means for independently adjusting the arms, both vertically and horizontally with respect to said bracket and to each other.

4. An insect destroying device comprising a pan and supporting arm, a wiper arm, a detachable bracket comprising a unitary member, common to both arms and means for independently adjusting said arms in said bracket.

5. An insect destroying device comprising a supporting bracket comprising a unitary member provided with an enlarged head portion, a pan supporting arm and a wiper arm slidably and pivotally supported in the enlarged head portion of said bracket.

6. An insect destroying device comprising a supporting bracket comprising a unitary member provided with an enlarged head portion, a pan supporting arm and a wiper arm pivotally mounted in said enlarged head portion and means carried by said bracket for maintaining said arms in various vertical and horizontal adjustments.

In testimony whereof I affix my signature.

LOOMIS McARTHUR GOODWIN.